(12) United States Patent
Naide et al.

(10) Patent No.: US 8,191,233 B2
(45) Date of Patent: Jun. 5, 2012

(54) HEAD STACK ASSEMBLY INCORPORATING DEVICE, MAGNETIC DISK DEVICE MANUFACTURING DEVICE, AND METHOD OF MANUFACTURING MAGNETIC DISK DEVICE

(75) Inventors: Ryousuke Naide, Kawasaki (JP); Takeshi Kurumizawa, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 266 days.

(21) Appl. No.: 12/727,041

(22) Filed: Mar. 18, 2010

(65) Prior Publication Data
US 2010/0238593 A1    Sep. 23, 2010

(30) Foreign Application Priority Data
Mar. 19, 2009    (JP) .................................. 2009-068386

(51) Int. Cl.
*G11B 5/127* (2006.01)
*H04R 31/00* (2006.01)

(52) U.S. Cl. ............... 29/603.05; 29/603.04; 29/603.07; 29/737; 269/13; 269/14; 360/294.4; 360/294.5; 360/294.6; 360/294.7; 414/222.12; 414/226.01; 700/245

(58) Field of Classification Search .. 29/603.03–603.07, 29/727, 737; 269/13, 14; 360/294.4–294.7; 414/222.12, 226.01; 700/245
See application file for complete search history.

(56) References Cited

U.S. PATENT DOCUMENTS
7,552,526 B1 *  6/2009 Klassen et al. ................. 29/729
2007/0081272 A1 *  4/2007 Shin .......................... 360/244.8

FOREIGN PATENT DOCUMENTS
| JP | 63-91866 | 6/1988 |
| JP | 2001-101818 | 4/2001 |
| JP | 2001-101818 A | 4/2001 |
| JP | 2002-251845 A | 9/2002 |
| JP | 2003-340656 | 12/2003 |
| JP | 2003-340656 A | 12/2003 |

OTHER PUBLICATIONS
Prior Art Information List.
Decision of a Patent Grant mailed by Japan Patent Office on Apr. 5, 2011 in the corresponding Japanese patent application No. JP 2009-068386.

* cited by examiner

*Primary Examiner* — Paul D Kim
(74) *Attorney, Agent, or Firm* — Knobbe, Martens, Olson & Bear LLP (57) ABSTRACT

According to one embodiment, a head stack assembly incorporating device connects a head stack assembly to the base of a magnetic disk device by screwing a connector on the bottom surface of the rotational shaft of the head stack assembly and a connector on the base of the magnetic device together. The head stack assembly incorporating device includes a chuck and a driving-force transmitter. The chuck pinches the rotational shaft of the head stack assembly from the upper surface of the head stack assembly to be fixed to the rotational shaft. The chuck is rotatable around the central axis of the rotational shaft. The driving-force transmitter transmits a rotational force to the chuck.

6 Claims, 9 Drawing Sheets

DRIVER FIT IN HSA

DRIVER FIT IN HSA

FIG.2C

CHUCK GRASPS (FIXES) BEARING

FIG.2D

- HSA IS INCORPORATED IN BASE PLATE
- SCREW TIGHTENING IS STARTED WHILE CHUCK GRASPS (FIXES) BEARING

FIG.3A

SCREW TIGHTENING IS COMPLETED
WHILE CHUCK GRASPS (FIXES) BEARING

FIG.3B

CHUCK RELEASES BEARING

FIG.3C

RETRACTION

FIG.3D

END OF DRIVER

HSA SETTING STATE

FIG.8C

HSA IS GRASPED (FIXED)

FIG.8D

HSA ANGLE IS CHANGED

CLIP IS DETACHED BY ABUTTING ON RAMP

HSA IS POSITIONED BY ABUTTING ON OUTER STOPPER

CLIP

HEAD STACK ASSEMBLY INCORPORATING DEVICE, MAGNETIC DISK DEVICE MANUFACTURING DEVICE, AND METHOD OF MANUFACTURING MAGNETIC DISK DEVICE

CROSS-REFERENCE TO RELATED APPLICATIONS

This application is based upon and claims the benefit of priority from Japanese Patent Application No. 2009-68386, filed on Mar. 19, 2009, the entire contents of which are incorporated herein by reference.

BACKGROUND

1. Field

One embodiment of the invention relates to a magnetic head incorporating device that incorporates a head stack assembly in a base, a magnetic disk device manufacturing device, and a method of manufacturing a magnetic disk device.

2. Description of the Related Art

A head stack assembly (HSA) incorporating device incorporates an HSA in a base as follows:
Process 1: set each component such as the HSA and an outer stopper on a palette and arrange the palette on a pick-up position
Process 2: pick up the HSA on the palette arranged on the pick-up position
Process 3: move the picked-up HSA to a mounting position of the base
Process 4: fix the HSA to the base
Process 5: load the HSA onto a ramp
Process 6: pick up the outer stopper on the palette arranged on the pick-up position
Process 7: move the outer stopper to the mounting position of the base and fix it In the process 4, the HSA is generally fixed to the base by tightening a screw from a rear surface of the base. Since conventional incorporating equipment employs this method, a mechanism that holds the HSA and moves the HSA to a fixed position on the base and a mechanism that tightens the screw from the rear surface are separately prepared, and the mechanisms perform the processes separately to fix the HSA to the base.

Recently, a method of fixing the HSA to the base by directly screwing a male screw provided on a bottom portion of a rotational shaft of the HSA to a female screw of the base is adopted. Reference may be had to, for example, Japanese Patent Application Publication (KOKAI) No. 2003-340656, Japanese Patent Application Publication (KOKAI) No. 2001-101818, and Japanese Utility Model Application Publication (KOKAI) No. S63-091866.

To fix the HSA that has the male screw on the bottom portion of the rotational shaft to be directly screwed into the female screw of the base and is fixed thereto, it is required to tighten the screw from above. Accordingly, a conventional screw-tightening mechanism needs to be installed above the HSA. Thus, it is necessary to ensure an installation space for the conventional screw-tightening mechanism, which increases an installation volume.

Further, according to the conventional technology, in the processes 1, 2, 6 and 7, the outer stopper is attached so that the HSA is not detached from the ramp after being loaded onto the ramp. When the HSA and the outer stopper are set on the palette at a position where the HSA is loaded onto the ramp, positions of a VCM coil of the HSA and the outer stopper overlap with each other. Therefore, they may not be set on the same plane (same palette). As a result, the conventional integrating device is not capable of picking up the outer stopper and the HSA at the same time and requires extra time, resulting in a longer takt time of incorporation.

Besides, as to a load bar mechanism, it is required to hold heads of the HSA always in an opened state. Accordingly, to avoid a plurality of heads from contacting in the process 4, it is necessary to open the heads by attaching a dedicated clip between the heads of the HSA until the HSA is loaded onto the ramp. Since the clip is detached and retrieved afterward, the load bar mechanism that inserts a thin plate (load bar) between the heads to open the heads at the time of loading is indispensable.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, a head stack assembly incorporating device is configured to connect a head stack assembly to the base of a magnetic disk device by screwing a connector on the bottom surface of the rotational shaft of the head stack assembly and a connector on the base of the magnetic device together. The head stack assembly incorporating device comprises a chuck and a driving-force transmitter. The chuck is configured to pinch the rotational shaft of the head stack assembly from the upper surface of the head stack assembly to be fixed to the rotational shaft. The chuck is rotatable around the central axis of the rotational shaft. The driving-force transmitter is configured to transmit a rotational force to the chuck.

According to another embodiment of the invention, a magnetic disk device manufacturing device comprises an incorporating device configured to connect a head stack assembly to a base of a magnetic device by screwing a connector on the bottom surface of the rotational shaft of the head stack assembly and a connector on the base of the magnetic disk device together. The incorporating device comprises a chuck and a driving-force transmitter. The chuck is configured to pinch the rotational shaft of the head stack assembly from the upper surface of the head stack assembly to be fixed to the rotational shaft. The chuck is rotatable around the central axis of the rotational shaft. The driving-force transmitter is configured to transmit a rotational force to the chuck.

According to still another embodiment of the invention, a method of manufacturing a magnetic disk device comprises incorporating a head stack assembly to connect the head stack assembly to the base of a magnetic disk device by screwing a connector on the bottom surface of the rotational shaft of the head stack assembly to a connector on the base of the magnetic device together. The incorporating comprises a chuck pinching the rotational shaft of the head stack assembly from an upper surface of the head stack assembly to be fixed to the rotational shaft, the chuck being rotatable around a central axis of the rotational shaft, and generating a rotational force to rotate the chuck.

A head stack assembly (HSA) incorporating device of an embodiment of the invention and an HSA holding/screw-tightening integrated mechanism is described.

An HSA incorporating device 100 of the embodiment is illustrated in FIGS. 1A to 1D. FIGS. 1A to 1D are a left side view, a front view, a right side view, and a top view of the HSA incorporating device 100, respectively.

Figure 1A:
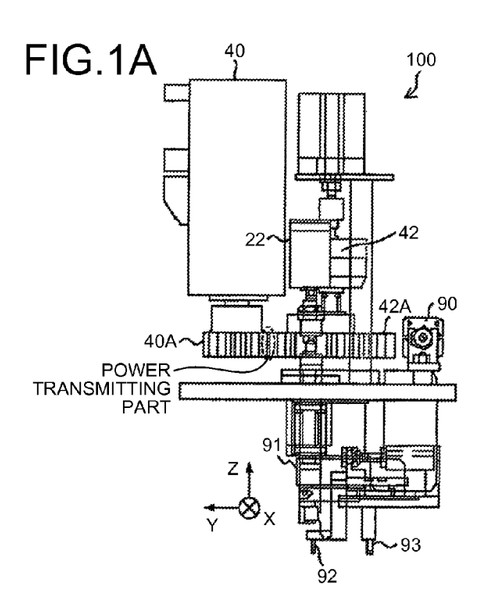
FIGS. 1A to 1D are exemplary front, side, and top views of a head stack assembly (HSA) incorporating device according to an embodiment of the invention.
Figure 1B:
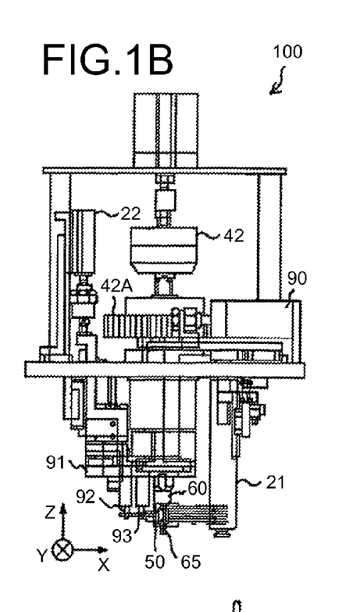
Figure 1C:
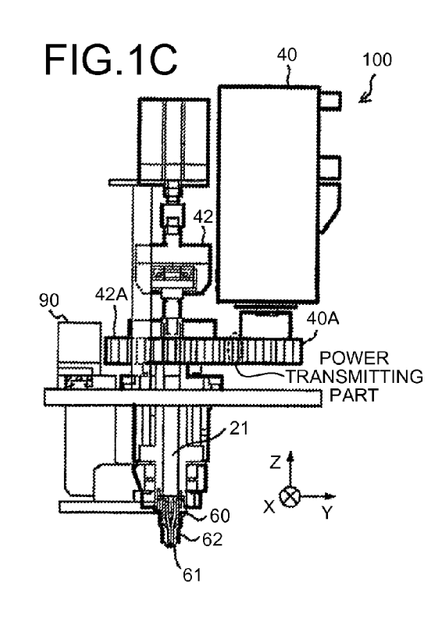
Figure 1D:
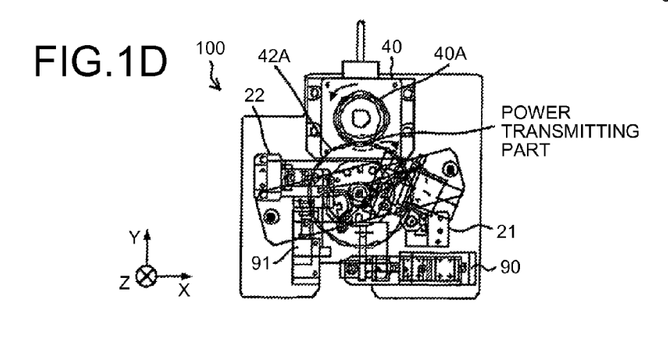

The HSA incorporating device 100 comprises a screw-tightening driving motor 40 and an HSA holding mechanism driver 42 (areas of the HSA holding mechanism driver 42 and the screw-tightening driving motor 40 are indicated by a bold line in FIG. 1C). The screw-tightening driving motor 40 is capable of managing torque by electronic control and is capable of managing screw-tightening torque as an electronic screw-tightening driver.

The HSA holding mechanism driver 42 is a mechanism that horizontally holds an HSA 50 in which a chuck 61 in a driver 60 on an end thereof rotates by driving force or power from the screw-tightening driving motor 40. The driver 60 holds and fits in the HSA 50. A configuration and an operation of the driver 60 are described below.

A gear 40A of the screw-tightening driving motor 40 and a gear 42A of the HSA holding mechanism driver 42 engage with each other. The gear 40A rotates by a driving force of the screw-tightening driving motor 40, and the gear 42A also rotates since it engages therewith. Meanwhile, an arrow in FIG. 1D indicates a rotational direction of the gear 40A and the gear 42A. The gear 42A is connected to the chuck 61 so that the chuck 61 rotates in conjunction with the rotation of the gear 42A.

The HSA incorporating device 100 further comprises a flexible printed circuits (FPC) absorber 21, an outer stopper attacher 22, an HSA loader 90 and an HSA pincher 91. Each element or part to which a reference numeral is given in FIG. 1A to 1D is described in detail below.

Figure 2A:
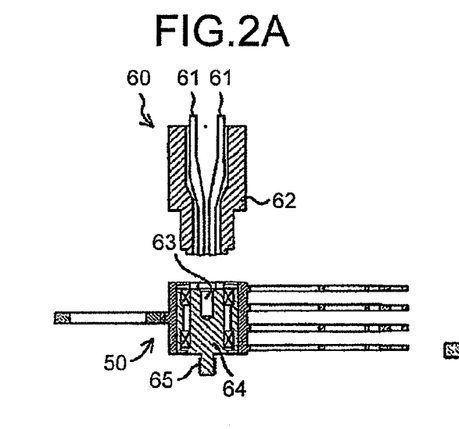
FIGS. 2A to 2D and 3A to 3D are exemplary views illustrating a method of fixing an HSA to a base in the embodiment.

Next, how the HSA holding mechanism driver 42 holds the HSA 50 and the HSA 50 is fixed to a base are described with reference to FIGS. 2A and 3D.

In the HSA holding mechanism driver 42 of the embodiment, the driver 60 mounted on the end thereof pinches (chucks) a rotational shaft of the HSA 50 to hold the HSA 50. The driver 60 mounted on the end is described. FIGS. 2A and 3D are cross-sectional views of the driver 60. As illustrated in FIG. 2A, for example, the driver 60 comprises the chuck 61 and a chuck protector 62 for protecting the chuck 61. There is a through-hole in the chuck protector 62 and an end portion of the chuck 61 protrudes from the through-hole. The driving force of the screw-tightening driving motor 40 is transmitted to the chuck 61 and the chuck 61 rotates. Meanwhile, the chuck 61 rotates around a central axis of the rotational shaft of the HSA 50.

Next, a mechanism of the rotational shaft of the HSA 50 is described. The HSA 50 comprises a bearing 64 rotatable in conjunction with the chuck 61 when held by the chuck 61. The bearing 64 comprises a screw hole 63 for being chucked by the chuck 61 and a male screw 65 for being fixed to the base on a rotational central axis thereof.

How the driver 60 fixes the HSA 50 to the base is described. FIG. 2A illustrates a state where the HSA 50 is set on the palette as an initial state. The driver 60 is arranged perpendicular to the HSA 50 and above the HSA.

Figure 2B:
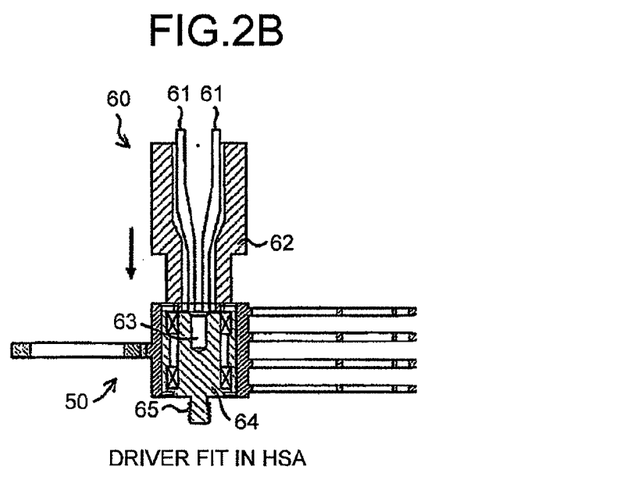

Thereafter, the driver 60 moves downward, and thereby the end protrusion of the chuck 61 is fitted in the screw hole 63 (FIG. 2B). Thereafter, the chuck 61 grasps (chucks) an inner wall of the bearing 64, i.e., a peripheral wall of the screw hole 63, and thereby the driver 60 is fixed to the HSA 50 (see FIG. 2C). While being chucked by the driver 60, the HSA 50 is moved from the palette to a mounting position of a base 70.

Figures 2C, 2D:
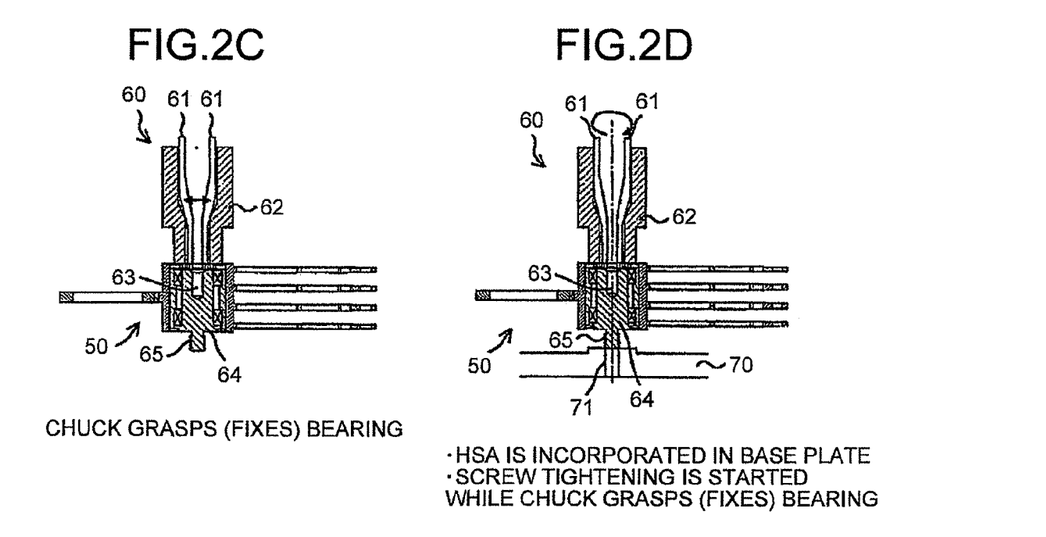
Figure 3A:
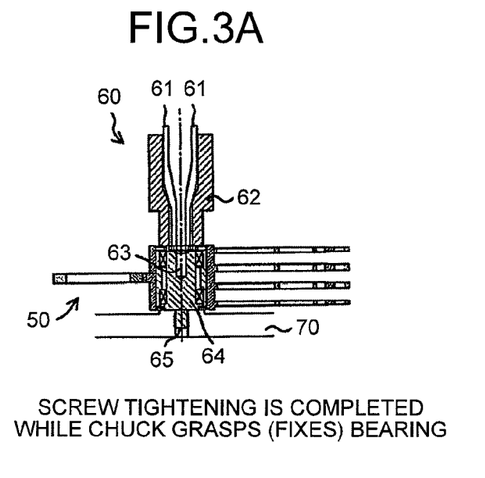

Since the bearing 64 is connected to the chuck 61 by the screw hole 63, when the chuck 61 rotates, the bearing 64 also rotates in conjunction therewith. By the rotation of the bearing 64, the male screw 65 and a female screw 71 of the base 70 are screwed together (tightened). FIG. 2D illustrates a state before starting the screw tightening. FIG. 3A illustrates a state after the screw tightening is completed.

Figure 3B:
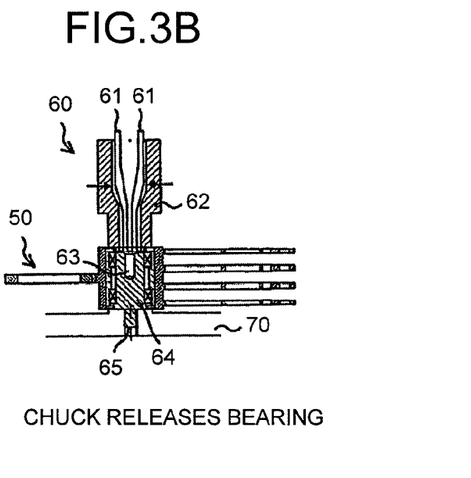
Figure 3C:
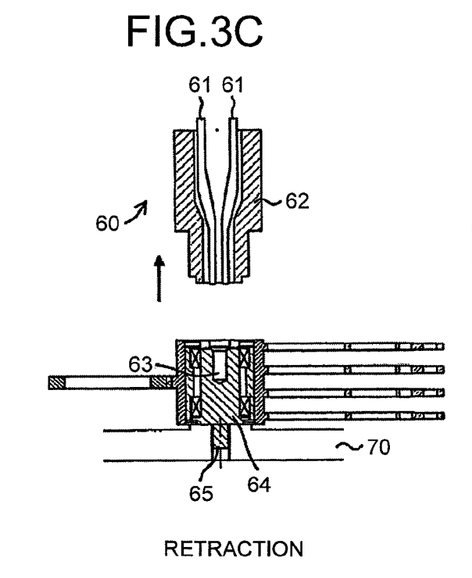

After the screw tightening is completed, the chuck 61 releases chuck of the screw hole 63 (FIG. 3B), and the driver 60 retracts upward. Thus, fixation of the HSA 50 to the base 70 is completed (FIG. 3C).

Figure 3D:
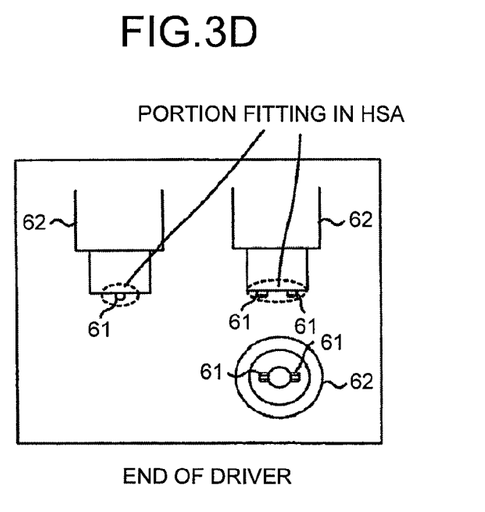

FIG. 3D is an end of the driver 60. An upper left part of FIG. 3D is a side view of the end. An upper right part of FIG. 3D is a front view of the end. A lower right part of FIG. 3D is a bottom view of the end. In this manner, a portion of the chuck 61 protrudes from the chuck protector 62.

Figure 4A:
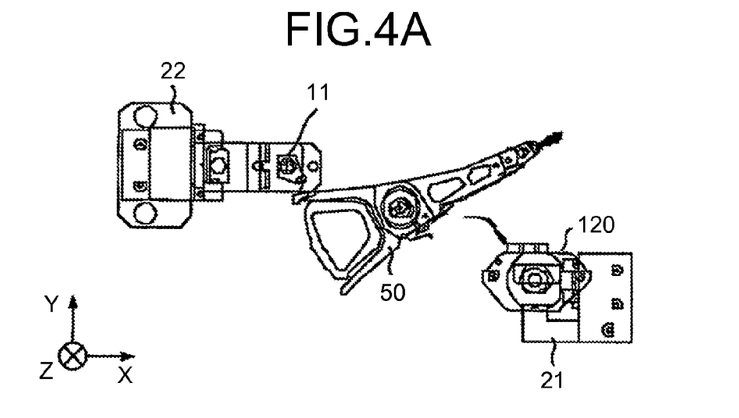
FIGS. 4A and 4B are exemplary front and top views of a flexible printed circuits (FPC) absorber and an outer stopper attacher in the embodiment.
Figure 4B:
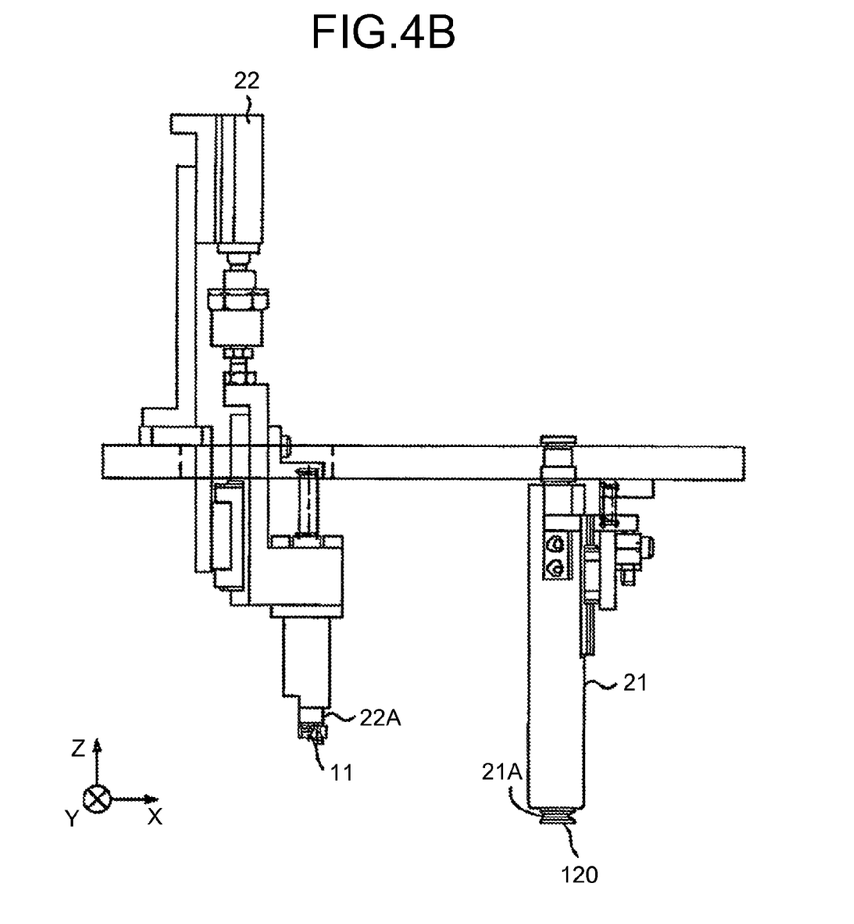

Next, the FPC absorber 21 and the outer stopper attacher 22, which are mechanisms associated with the "HSA holding/screw-tightening integrated mechanism", are described with reference to FIGS. 4A and 4B. FIG. 4A is a top view of the FPC absorber 21 and the outer stopper attacher 22 when an outer stopper 11 and an FPC 120 are held. FIG. 4B is a front view of the FPC absorber 21 and the outer stopper attacher 22.

The FPC absorber 21 is a device for obtaining the FPC 120, which is a part to transmit a signal from a head and a driving current to a voice coil motor (VCM), from the palette to incorporate it in the base. The FPC 120 is absorbed from the palette in a vacuum state by an end 21A of the FPC absorber 21 to be incorporated in the base. The FPC absorber 21 has a compliance function in a Z-axis direction.

The outer stopper attacher 22 takes out the outer stopper 11 from the palette by inserting the outer stopper 11 into an end 22A, and mounts the outer stopper 11 on the base. After holding the outer stopper 11, the outer stopper attacher 22 retracts the outer stopper 11 above the HSA 50 until the HSA 50 is fixed to the base and the HSA 50 is loaded onto the ramp. By retracting the outer stopper 11 in this manner, interference between the HSA 50 and the outer stopper 11 can be avoided.

Figures 5A, 5B, 5C, 5D:
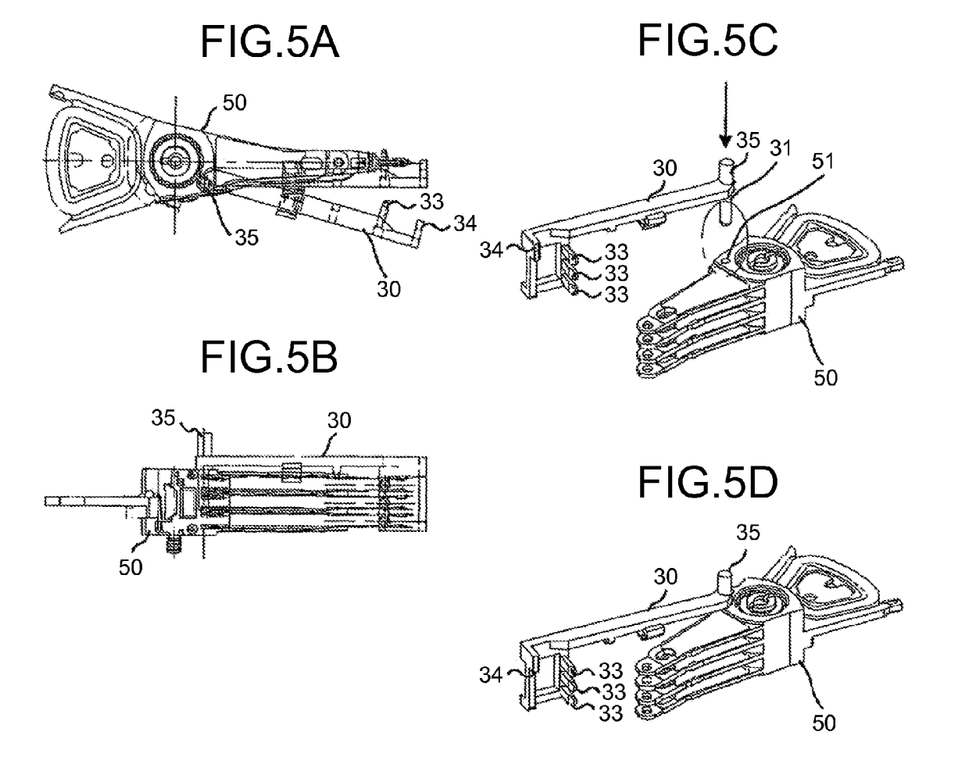
FIGS. 5A to 5E are exemplary views illustrating a structure of a clip in the embodiment.
Figure 5E:
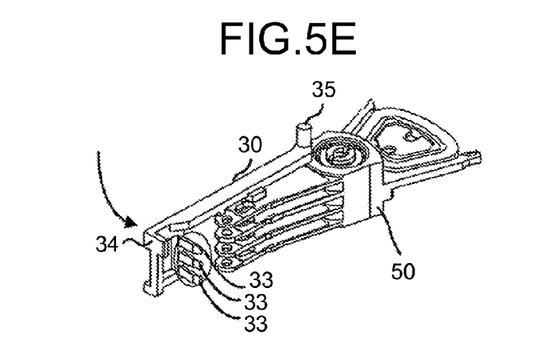

Next, a structure of a clip, i.e., "loading mechanism with clip" of the embodiment, is described with reference to FIG. 5A to 5E. FIG. 5A is a top view of the HSA 50 on which a clip 30 is mounted according to the embodiment. FIG. 5B is a side view of the HSA 50 on which the clip 30 is mounted. FIGS. 5C, 5D and 5E are transition diagrams illustrating that the clip 30 is mounted on the HSA 50.

The clip 30 comprises an insertion portion 31, a comb-teeth 33, a protrusion 34, and a clip shaft 35. The HSA 50 has an insertion opening 51 into which the insertion portion 31 is inserted.

The insertion portion 31 is a rod-like protrusion for connecting the clip 30 to the HSA 50 by being inserted in the insertion opening 51 of the HSA 50. The comb-teeth 33 is a claw-shaped part interposed between heads of the HSA 50 for maintaining a regular interval between the heads to avoid the heads to contact each other. The comb-teeth 33 is interposed between the heads when the HSA 50 is connected to the clip 30 and the clip 30 is positioned along a side surface of the HSA 50.

The protrusion 34 is a part protruding toward the HSA 50 and contacts the ramp when the HSA 50 is loaded onto the ramp. The comb-teeth 33 is detached from the head by contact between the protrusion 34 and the ramp. The clip shaft 35 is a rod-like protrusion used when removing the clip 30 after the HSA 50 is loaded on the ramp.

Transition when the clip 30 is mounted on the HSA 50 is described with reference to FIGS. 5C, 5D and 5E.

FIG. 5C is a view illustrating a state before the clip 30 is mounted on the HSA 50. The insertion portion 31 of the clip 30 is inserted into the insertion opening 51 of the HSA 50 to connect the clip 30 to the HSA 50. FIG. 5D is a view illustrating a state in which the clip 30 is connected to the HSA 50. When connected to the HSA 50 as illustrated in FIG. 5D, the clip 30 can rotate relative to the HSA 50 around the insertion portion 31 as an axis.

In such a state, by rotating the clip 30 until a longitudinal portion of the clip 30 lies along the side surface of the HSA 50 (side surface of an arm), the comb-teeth 33 is interposed between the heads of the HSA 50 and intervals between the heads are held constant. Meanwhile, in FIGS. 5C, 5D and 5E, the heads of the HSA 50 are not illustrated.

Figure 6:
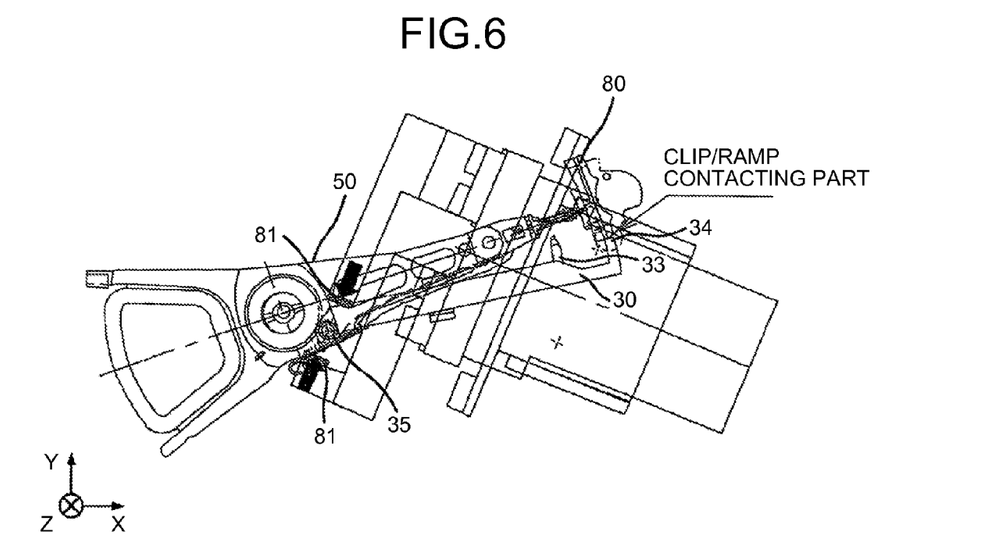
FIG. 6 is an exemplary view illustrating the case where the clip is detached by contact with a ramp in the embodiment.

Next, how the clip is detached when the HSA 50 is loaded on the ramp is described with reference to FIG. 6.

First, when the heads of the HSA 50 are loaded onto a ramp 80, the ramp 80 contacts the protrusion 34 of the clip 30. The comb-teeth 33 is also detached from the heads by the contact.

While the comb-teeth 33 is detached from the head, the clip shaft 35 is grasped by a clip retrieving mechanism having a grasper 81 opened and closed by an air chuck, and the clip 30 is withdrawn from the HSA 50 simultaneously with elevation of the HSA holding mechanism driver 42. The clip retrieving mechanism may be provided on the HSA holding mechanism driver 42, or may be a mechanism separate from the HSA holding mechanism driver 42.

In this manner, since the embodiment adopts a simple structure, i.e., the loading mechanism with clip, in place of a load bar mechanism having a complex structure, an equipment may be simplified.

Figure 7:
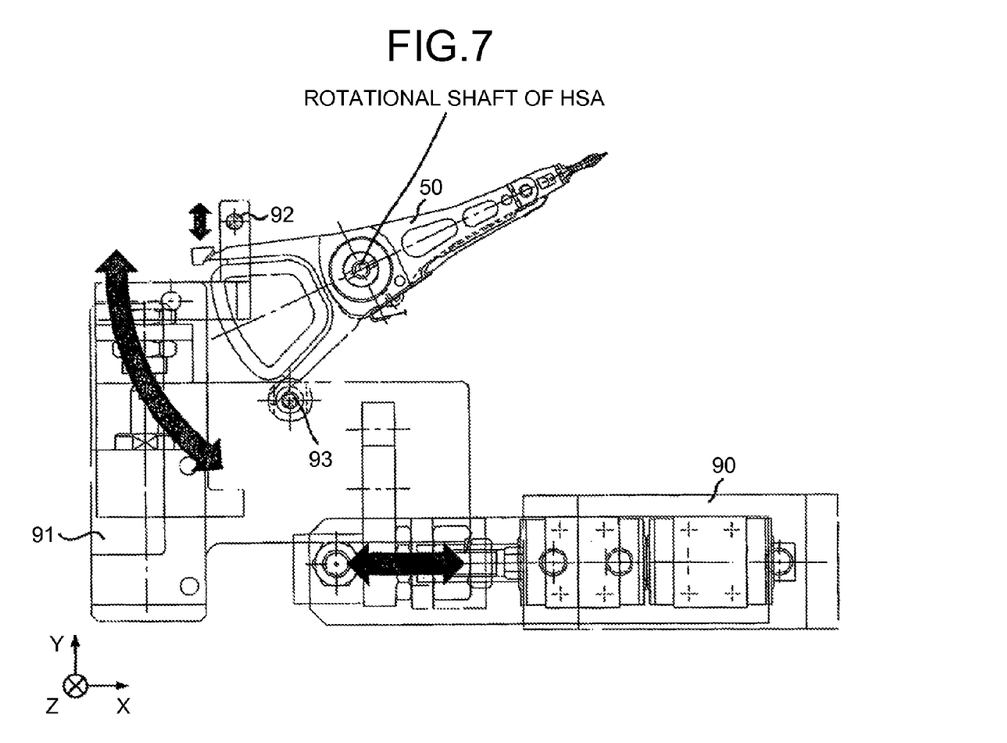
FIG. 7 is an exemplary view illustrating the operation of an HSA pincher and an HSA loader in the embodiment.

Next, the HSA loader 90 and the HSA pincher 91, i.e., "mechanism that enables the component on the palette to be arranged at the same position when loaded on the ramp", are described with reference to FIG. 7. The HSA loader 90 is a mechanism connected to the HSA pincher 91 that rotates the HSA pincher 91 around the shaft of the HSA 50 as a central axis by expanding and contracting in the horizontal direction (X-axis direction) in FIG. 7 by using a cylinder.

The HSA pincher 91 is a mechanism comprising an operating pin 92 and a fixing-side pinching pin 93 that pinch the side surface of the HSA 50 to fix the HSA 50. The HSA pincher 91 rotates around the shaft of the HSA 50 by receiving a driving force from the HSA loader 90. The fixing-side pinching pin 93 is fixed and does not move relative to the HSA pincher 91. The operating pin 92 is movable in the vertical direction (Y-axis direction) in FIG. 7. The operating pin 92 and the fixing-side pinching pin 93 protrude downward in a Z-axis direction below the HSA pincher 91 and, when the HSA pincher 91 pinches the HSA 50, wait above the same in the Z-axis direction, and thereafter move downward in the Z-axis direction to pinch the HSA 50.

Since the HSA loader 90 and the HSA pincher 91 may change an angle of the HSA 50 as described above, each component can be arranged on the palette (on the same plane) and at the position when loaded on the ramp (for a reason of this, refer to "setting method of incorporation of the HSA and other component" described below). Therefore, although the conventional incorporating device is not capable of picking up the outer stopper and the HSA at the same time and requires extra time, which results in a longer takt time, the embodiment can reduce the time required of an incorporating process.

Next, "setting method of incorporation of the HSA and other component", i.e., a series of operations of the HSA incorporating device 10 is described with reference to FIGS. 8A to 10B. In the following description, the operations illustrated in FIGS. 2A to 3D are also referred to in each case.

Figure 8A:
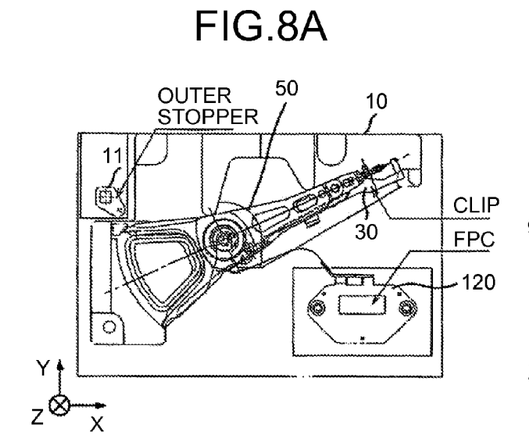
FIGS. 8A to 8D, 9A to 9D, and 10A and 10B are exemplary views illustrating a process of incorporating an HSA in a base in the embodiment.

FIG. 8A illustrates a state in which the outer stopper 11, the HSA 50, the clip 30 and the FPC 120 are set on a palette 10. The outer stopper 11, the HSA 50, the clip 30 and the FPC 120 are set on the palette 10 in arrangement relationship at the time of loading and in arrangement relationship on the same plane. After each component is set on the palette 10, the palette 10 is moved to a predetermined pick-up position. The pick-up position is below the HSA incorporating device 100 such that all the movement processes of the components are performed only in the Z-axis direction.

The outer stopper attacher 22 takes out the outer stopper 11 on the palette 10 from the palette 10 to hold. The HSA holding mechanism driver 42 takes out the HSA 50 connected to the clip 30 from the palette 10 to hold. The FPC absorber 21 takes out the FPC 120 from the palette 10 to hold. The HSA holding mechanism driver 42 shifts from a state illustrated in FIG. 2B to a state illustrated in FIG. 2C (state being chucked by the chuck 61).

Next, the outer stopper attacher 22 and the FPC absorber 21 move the outer stopper 11 and the FPC 120 above the HSA 50 (in the Z-axis direction) for temporarily retracting the outer stopper 11 and the FPC 120. At this time, the palette 10 is withdrawn from the pick-up position.

Figure 8B:
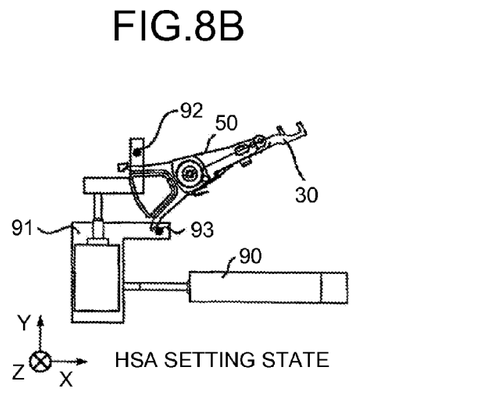
Figure 8C:
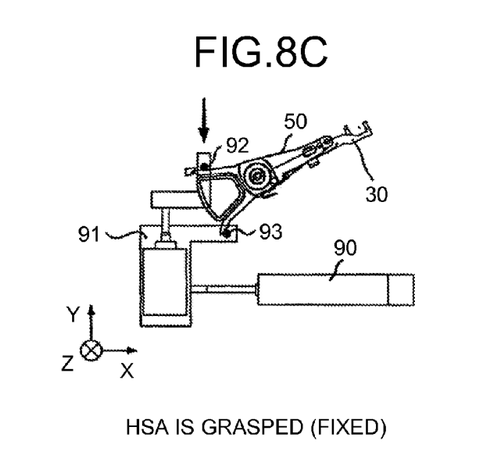

The HSA loader 90 and the HSA pincher 91 waiting above the position at which each component is picked up move downward in the Z-axis direction to pinch the HSA 50 by the operating pin 92 and the fixing-side pinching pin 93. This state is illustrated in FIG. 8B. The HSA pincher 91 pinches the HSA 50 by the operating pin 92 and the fixing-side pinching pin 93 by moving the operating pin 92 in a direction of an arrow in FIG. 8C (see FIG. 8C).

Figure 8D:
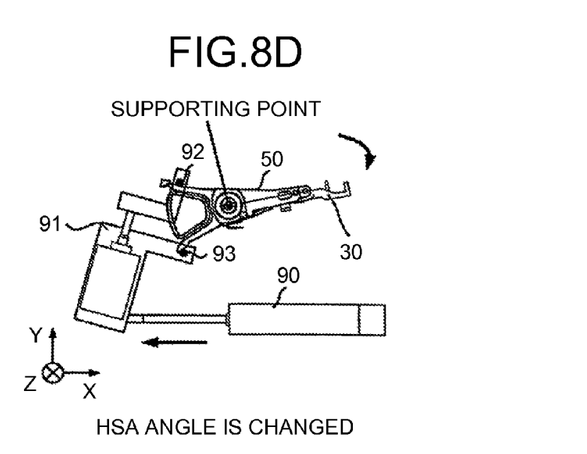

Next, the HSA loader 90 rotates the HSA pincher 91 such that the HSA 50 is at an angle with which it does not contact the ramp 80 when mounted on the base (see FIG. 8D). Since the shaft of the HSA 50 is fixed by the HSA holding mechanism driver 42, the HSA pincher 91 rotates around the shaft of the HSA 50 as a supporting point.

Figure 9A:
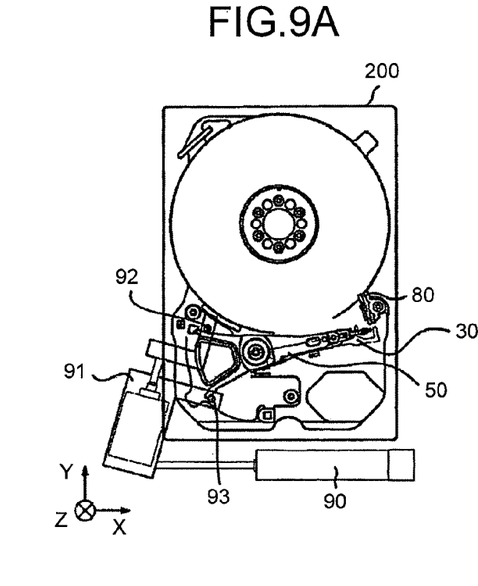

Thereafter, the HSA holding mechanism driver 42, the HSA loader 90, and the HSA pincher 91 move downward (in the Z-axis direction), thereby incorporating the HSA 50 in the base of a magnetic disc device 200 (see FIG. 9A). The angle of the HSA 50 at this time remains as illustrated in FIG. 8D.

Figure 9B:
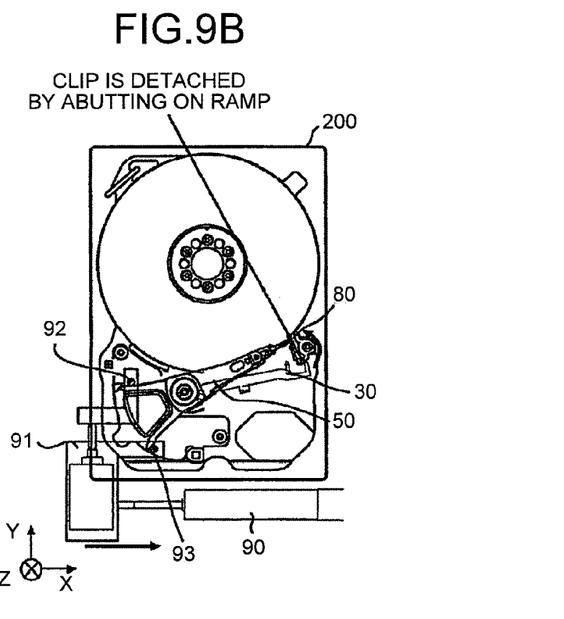
Figure 9C:
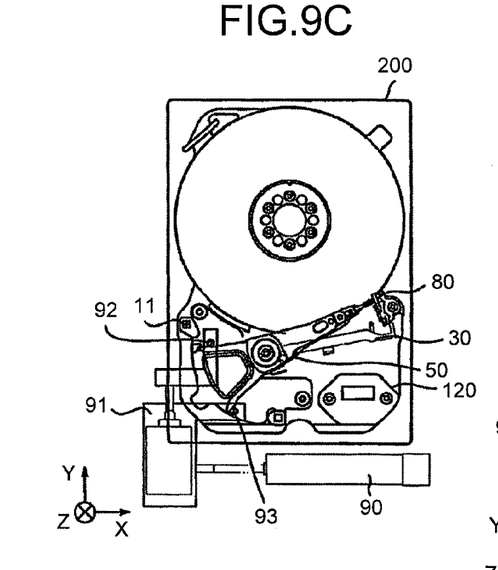
Figure 9D:
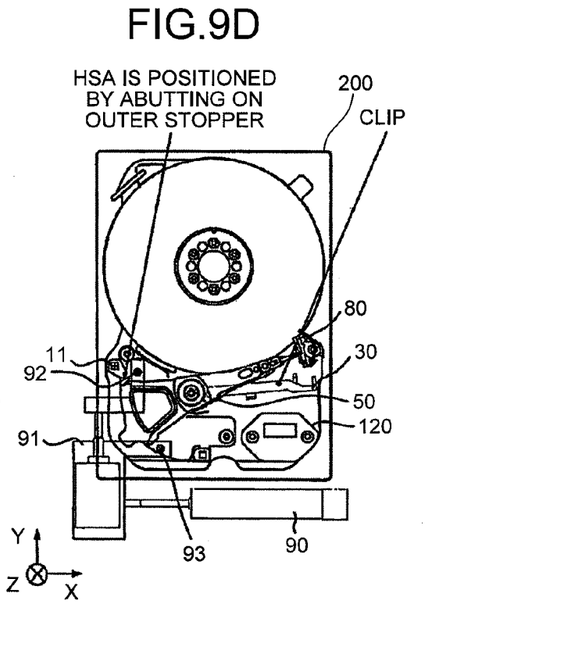

Next, the HSA loader 90 is contracted in a direction of an arrow in FIG. 9B, thereby rotating the HSA pincher 91 to load the heads of the HSA 50 onto the ramp 80 (see FIG. 9B). At this time, the protrusion 34 of the clip 30 contacts the ramp 80, and the clip 30 is detached.

Thereafter, the FPC absorber 21 and the outer stopper attacher 22 move downward (in the Z-axis direction). Accordingly, the outer stopper 11 and the FPC 120 retracting upward are attached to the magnetic disk device (see FIG. 9C). Note that the arrangement position in this state is the same as the arrangement state on the palette 10.

The chuck 61 of the HSA holding mechanism driver 42 releases the chuck of the HSA 50. By release of the chuck, the HSA 50 abuts on the outer stopper 11 by magnetic force and the position of the HSA 50 is determined (see FIG. 9D).

Figure 10A:
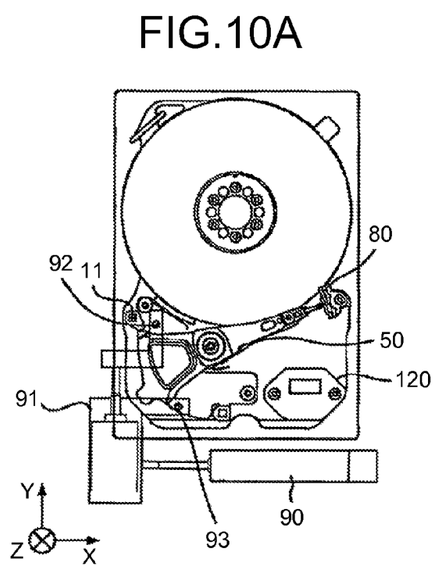
Figure 10B:
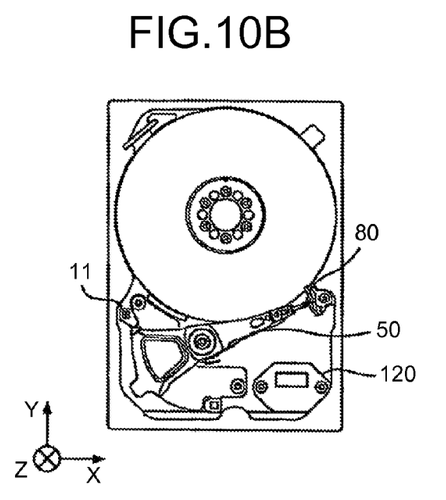

The clip 30 is removed as the clip shaft 35 is grasped by the grasper 81 (see FIG. 10A). Further, an incorporating mechanism (the HSA holding mechanism driver 42, the FPC absorber 21, the outer stopper attacher 22, the HSA loader 90, and the HSA pincher 91) of the HSA incorporating device 100 is also removed (see FIG. 10B).

As described above, the components can be set on a supplying portion (palette) according to not the positional relationship at the time of mounting but the positional relationship at the time of loading. Thus, interference between the components can be avoided when they are arranged on the palette. With this, the components can be set on the same plane, and time of component pick-up can be reduced. By integrating the incorporating mechanism of the outer stopper with the incorporating mechanism of the HSA as in the HSA incorporating device 100, compact equipment may be realized.

The HSA incorporating device of the embodiment may be incorporated in the conventional magnetic disk manufacturing device and magnetic disk manufacturing system. That is, according to the embodiment, the magnetic disk manufacturing device and the magnetic disk manufacturing system incorporating the HSA incorporating device 100 may be provided.

The HSA incorporating process of the embodiment may be applied to the conventional process of manufacturing the magnetic disk device. That is, according to the embodiment, the method of manufacturing the magnetic disk device in which the HSA incorporating process is performed may be provided.

The HSA incorporating device 100 can perform a complete flow from the pick-up of the components to the attachment of the outer stopper in one equipment. Since the mount head has integrated functions of holding/screw tightening, the outer stopper attachment, and the like, the equipment can be compact. Moreover, since the heads are not replaced for each operation, the takt time of an entire process may be reduced.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A head stack assembly incorporating device configured to connect a head stack assembly to a base of a magnetic disk device by screwing a connector on a bottom surface of a rotational shaft of the head stack assembly and a connector on the base of the magnetic device together, the head stack assembly incorporating device comprising:

a chuck configured to pinch the rotational shaft of the head stack assembly from an upper surface of the head stack assembly, and to rotate around a central axis of the rotational shaft; and a driving-force transmitter configured to transmit a rotational force to the chuck.

2. The head stack assembly incorporating device of claim 1, further comprising a loader configured to change a first angle of the head stack assembly by rotating the head stack assembly around the rotational shaft, wherein the chuck is configured to receive the head stack assembly from a palette comprising the head stack assembly thereon at a second angle equal to the first angle of the head stack assembly on a ramp of the magnetic disk device in order to hold the head stack assembly by pinching the rotational shaft, and the loader is configured to change the second angle of the head stack assembly to a third angle in such a manner that the head stack assembly comprises a gap with the ramp of the magnetic disk device when the head stack assembly is mounted on the base of the magnetic disk device.

3. The head stack assembly incorporating device of claim 1, further comprising a clip comprising:

a head interval holder configured to hold heads of the head stack assembly at a predetermined interval; and a protrusion configured to release the heads by the head interval holder by attaching a side surface of the ramp when the head stack assembly is loaded on the ramp of the magnetic disk device.

4. The head stack assembly incorporating device of claim 1, wherein the driving-force transmitter comprises:

a first gear connected to the chuck; and a second gear engaged with the first gear and coupled to a rotary motor configured to generate a rotational force; and the rotational force is transmitted to the chuck via the rotary motor and the second gear.

5. A magnetic disk device manufacturing device comprising an incorporating device configured to connect a head stack assembly to a base of a magnetic device by screwing a connector on a bottom surface of a rotational shaft of the head stack assembly and a connector on the base of the magnetic disk device together, wherein the incorporating device comprises a chuck configured to pinch the rotational shaft of the head stack assembly from an upper surface of the head stack assembly to be attached to the rotational shaft, and to rotate around a central axis of the rotational shaft, and a driving-force transmitter configured to transmit a rotational force to the chuck.

6. A method of manufacturing a magnetic disk device comprising incorporating a head stack assembly in order to connect the head stack assembly to a base of a magnetic disk device by screwing a connector on a bottom surface of a rotational shaft of the head stack assembly to a connector on the base of the magnetic device together, wherein the incorporating comprises:

pinching the rotational shaft of the head stack assembly from an upper surface of the head stack assembly in order to attach a chuck to the rotational shaft, the chuck configured to rotate around a central axis of the rotational shaft, and generating a rotational force in order to rotate the chuck.

* * * * *